United States Patent
Liang et al.

(10) Patent No.: US 11,068,447 B2
(45) Date of Patent: Jul. 20, 2021

(54) DIRECTORY LEVEL ATOMIC COMMIT PROTOCOL

(71) Applicant: Databricks Inc., San Francisco, CA (US)

(72) Inventors: Eric Keng-hao Liang, Berkeley, CA (US); Srinath Shankar, Belmont, CA (US); Shi Xin, San Francisco, CA (US)

(73) Assignee: Databricks Inc., San Francisco, CA (US)

( * ) Notice: Subject to any disclaimer, the term of this patent is extended or adjusted under 35 U.S.C. 154(b) by 850 days.

(21) Appl. No.: 15/487,896

(22) Filed: Apr. 14, 2017

(65) Prior Publication Data

US 2018/0300354 A1    Oct. 18, 2018

(51) Int. Cl.
*G06F 16/18* (2019.01)
*G06F 16/16* (2019.01)
*G06F 16/182* (2019.01)

(52) U.S. Cl.
CPC ........ *G06F 16/1865* (2019.01); *G06F 16/162* (2019.01); *G06F 16/182* (2019.01)

(58) Field of Classification Search
CPC ... G06F 16/1865; G06F 16/162; G06F 16/182
USPC ....................................................... 707/703
See application file for complete search history.

(56) References Cited

U.S. PATENT DOCUMENTS

| | | | |
|---|---|---|---|
| 8,959,125 B2* | 2/2015 | Dodge | G06F 16/13 707/826 |
| 2014/0156618 A1* | 6/2014 | Castellano | G06F 16/2358 707/703 |
| 2014/0337364 A1* | 11/2014 | Agarwal | G06F 11/3428 707/758 |
| 2016/0217177 A1* | 7/2016 | Niikura | G06F 16/2358 |

OTHER PUBLICATIONS

Chacon, Scott and Ben Straub."2.3 Git Basics—Reviewing Commit History." Pro Git Second Edition. 2014. 11 pages. (Year: 2014).*

* cited by examiner

*Primary Examiner* — Kimberly L Wilson
(74) *Attorney, Agent, or Firm* — Van Pelt, Yi & James LLP

(57) ABSTRACT

A system for directory level atomic commits includes an interface and a processor. The interface is configured to receive an indication to provide a set of files. The processor is configured to determine whether a file in a directory has been either 1) atomically committed or 2) written by a non-atomic process and not designated as deleted and provide the file as one file of the set of files in the event that the file in the directory has been either 1) atomically committed or 2) written by a non-atomic process and not designated as deleted.

19 Claims, 8 Drawing Sheets

US 11,068,447 B2

DIRECTORY LEVEL ATOMIC COMMIT PROTOCOL

BACKGROUND OF THE INVENTION

Distributed filesystems and/or storage are not guaranteed to produce consistent read results immediately after modifications. This creates a problem in the event that a cluster system uses a distributed storage for storage. One issue arises when a distributed storage is used to store intermediate results from a cluster computing job in that inconsistent read results are potentially read from partially completed processes. Another issue arises from race conditions caused by reading a storage directory while a cluster system is writing, which can also provide inconsistent information.

BRIEF DESCRIPTION OF THE DRAWINGS

Various embodiments of the invention are disclosed in the following detailed description and the accompanying drawings.

DETAILED DESCRIPTION

Figure 1:
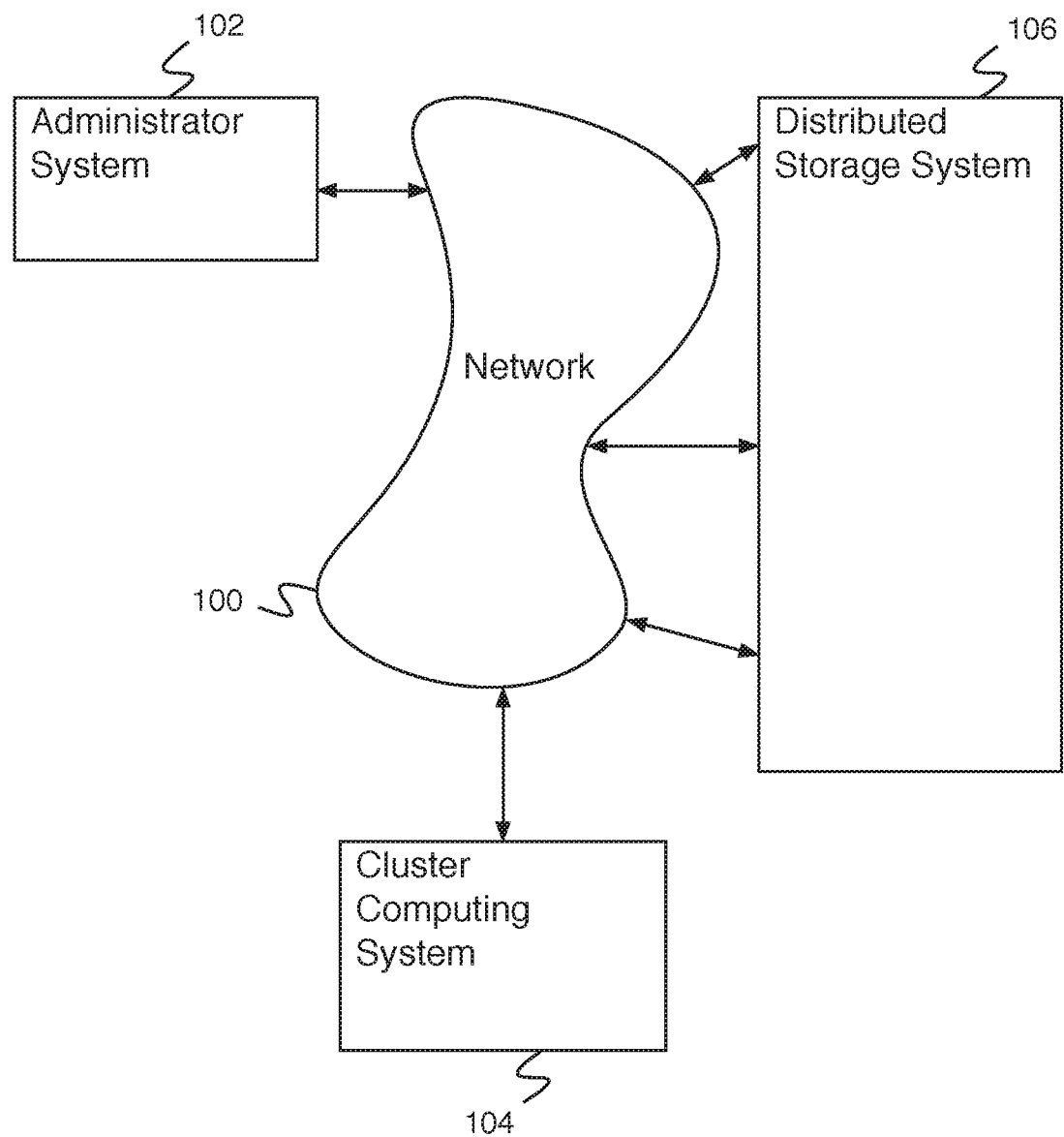
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for directory level atomic commits is disclosed. The system includes an interface and a processor. The interface is configured to receive an indication to provide a set of files. The processor is configured to determine whether a file in a directory has been either 1) atomically committed or 2) written by a non-atomic process and not designated as deleted, and to provide the set of files in the event that the file in the directory has been either 1) atomically committed or 2) written by a non-atomic process and not designated as deleted. In some embodiments, the system additionally comprises a memory coupled to the processor and configured to provide the processor with instructions.

In some embodiments, given a key-value file storage system that provides read-after-write consistency for single keys, the system for directory level atomic commits creates and deletes multiple transaction files within a directory in one atomic operation. To achieve the directory level atomic commits, client code is modified for both readers and writers. A client modified to use the directory level atomic commit algorithm can read files written by clients not using the algorithm. Unmodified clients may also read files written by the directory level atomic commit system, however the same atomicity guarantees do not apply to these clients unless a garbage collection is run.

In some embodiments, clients choose a unique transaction identifier (e.g., <tid>) for a transaction and create a start marker record (e.g., a file with the name "_started-<tid>") in a designated storage location (e.g., a directory). Files written by the client for this transaction must have embedded in their filename a string associated with the transaction identifier (e.g., a unique string "tid-<tid>"). To commit files associated with a transaction, the client writes a committed marker record (e.g., a file with the name "_committed-<tid>") that contains the names of files created and removed in the transaction. The key operation for directory level atomic commits is the listing of a directory. A listing should reflect all-or-none of the effects of a transaction. To do this, clients specially handle files that have an associated transaction identifier (e.g., as indicated in metadata, in the name, a string associated or in the file—for example, "tid-<tid>", etc.) in their name. In some embodiments, clients (both new and legacy) process files without the <tid> as valid in the event that there is neither a start marker indication (e.g., in a start marker record) nor a committed marker indication (e.g., in a committed marker record) related to the file. In some embodiments, in the event that there is a related committed marker indication (e.g., in a committed marker record), a file with a <tid> will be processed the same way as one without a <tid>. The client must check whether the file is committed in that transaction by querying the corresponding committed marker record (e.g., "_committed-<tid>" file). In the event that no such committed marker record is found and the start marker record exists for that transaction, then the file is omitted from a returned listing of a directory. For files created by legacy or non-atomic compatible systems, in the event that a committed marker record does not name that file as "deleted" in the transaction, the file is not omitted from a returned listing of a directory. In addition, files marked as deleted by any committed marker file are also omitted from a returned listing of a directory. To guarantee strong atomicity, it is sometimes necessary to issue additional listing calls to resolve possible race conditions encountered during the additional listing. This is because key-value stores typically only provide consistent LIST-after-PUT for single keys. However, readers may not observe writes in order due to the lack of snapshot isolation within a single LIST operation. Write order visibility is a problem in the event that a start marker PUT operation gets re-ordered after a data file write from a reader's perspective. To work around this issue, a directory is listed again in the event that a start marker is suspected to be missing. The same issue can occur with data file writes re-ordered after a commit marker creation. In this situation, the directory is relisted in the event that data files are suspected to be missing.

In some embodiments, the system supports transactions spanning multiple "directories" in the storage system. This can be done by, in addition to writing committed markers for files written, storing a transaction state (e.g., PENDING, COMMITTED) in an external transaction manager. The transaction manager can, given a chosen logical timestamp, return to clients whether any given transaction was committed at that logical timestamp. This provides snapshot isolation for clients across multiple directories managed by directory commit. A vacuum command can be provided to remove uncommitted files or files marked as deleted by directory commit transactions. This allows the user to free up space used by unnecessary files, and also to remove these files from view in the event that the directories are also to be read by clients that are not modified to handle the atomic protocol. In some embodiments, garbage collection is done in careful order and with appropriate delays to prevent concurrent readers from observing anomalies. Importantly, start marker records are removed before commit marker records, and a delay is enforced between the removals. Similarly, uncommitted files are removed before commit marker records again with a delay in between. In order to enforce these delays, a directory commit operation marks old marker records for deletion. To prevent the undesired buildup of garbage records and/or files because the user did not run the vacuum command, directory commit writers run garbage collection automatically on the termination of a data processing job. This automated garbage collection is done in parallel over updated directories and so has little extra overhead.

FIG. 1 is a block diagram illustrating an embodiment of a network system. In some embodiments, the network system of FIG. 1 comprises a system for managing data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, and distributed storage system 106 communicated via network 100. In the example shown, administrator system 102 comprises an administrator system for use by an administrator. In various embodiments, administrator system 102 comprises an administrator system for executing administrator commands, for executing jobs using cluster computing system 104, for querying the status of jobs on cluster computing system 104, for storing data on distributed storage system 106, for retrieving data from distributed storage system 106, or for any other appropriate administrator system purpose. Cluster computing system 104 comprises a cluster computing system for executing cluster computing jobs. In various embodiments, cluster computing system 104 comprises a computer, a multiprocessor computer, a plurality of computers, a plurality of multiprocessor computers, or any other appropriate cluster computing system. In some embodiments, one or more computers of cluster computing system 104 store data of cluster computing jobs on distributed storage system 106. Distributed storage system 106 comprises a distributed storage system for storing data. In some embodiments, distributed storage system 106 comprises a commercially provided distributed storage system service (e.g., Amazon™ S3). Distributed storage system 106 comprises a plurality of storage systems. In some embodiments, distributed storage system 106 comprises a plurality of storage systems distributed geographically. In some embodiments, the plurality of storage systems of distributed storage system 106 communicate via network 100. In some embodiments, a user system (not shown) provides a job or task to be performed by cluster computing system 104 either directly to cluster computing system 104 or indirectly using administrator system 102.

Figure 2:
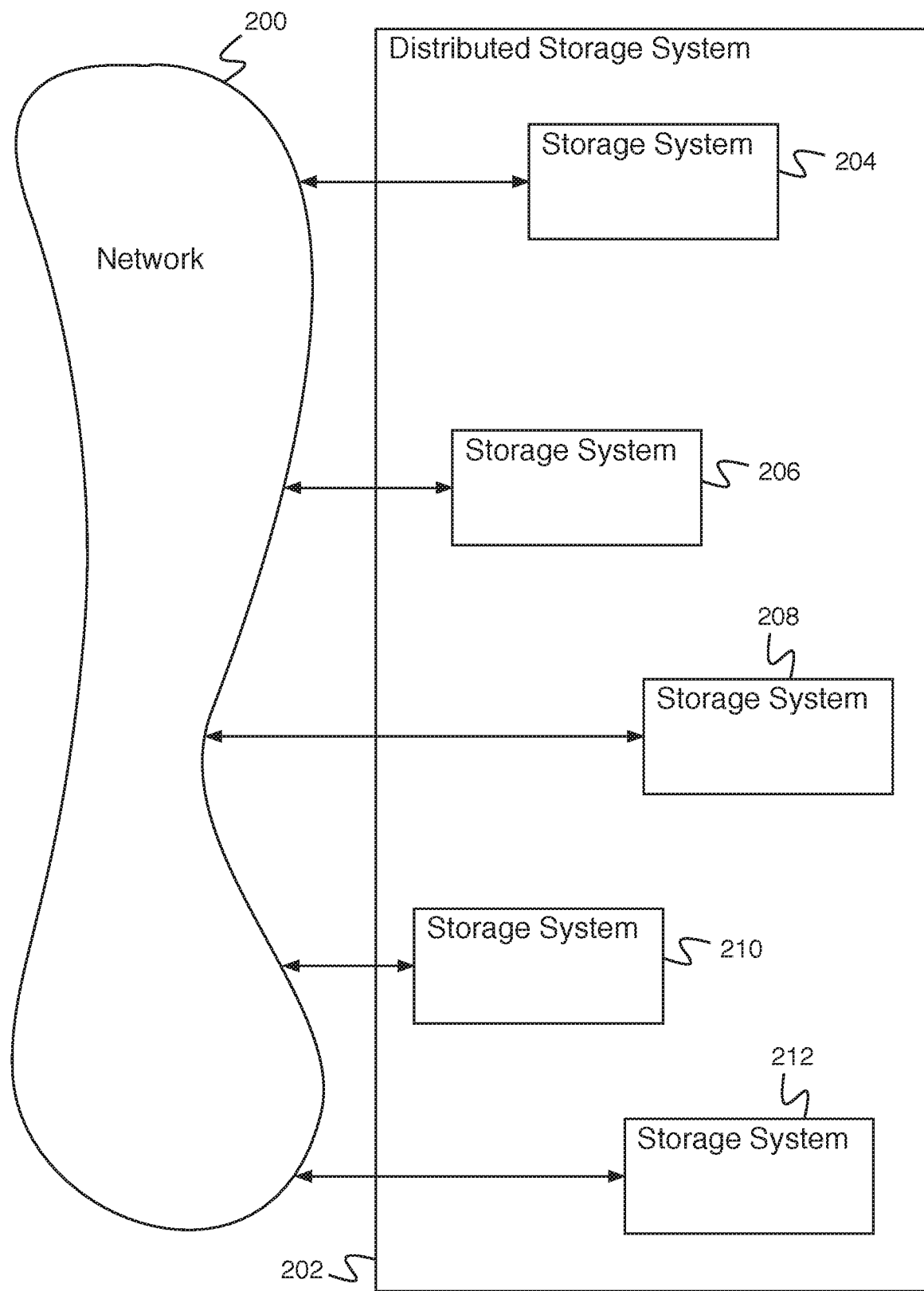
FIG. 2 is a block diagram illustrating an embodiment of a distributed storage system.

FIG. 2 is a block diagram illustrating an embodiment of a distributed storage system. In some embodiments, distributed storage system 202 is used to implement distributed storage system 106 of FIG. 1 and network 200 comprises network 100 of FIG. 1. In the example shown, distributed storage system 202 comprises a plurality of storage systems (e.g., storage system 204, storage system 206, storage system 208, storage system 210, and storage system 212). The storage systems of distributed storage system 202 communicate via network 200. In some embodiments, storage systems of distributed storage system 202 are distributed geographically (e.g., across an organization campus, across a country, across the world, etc.). When a storage system user (e.g., a user or administrator system, a cluster computing system, etc.) accesses distributed storage system 202 via network 200, the user is put in communication with a storage system of distributed storage system 202. In various embodiments, the user is put in communication with the storage system that is closest to the user, that is least loaded, that is most up to date, that has be accessed least recently, that has relevant data stored, or any other appropriate storage system. In some embodiments, distributed storage system 202 ensures that each of the plurality of storage systems behaves the same (e.g., provides the same data in response to a read data command). In some embodiments, data is mirrored between storage systems of distributed storage system 202 (e.g., each storage system stores the same data). In some embodiments, data is consistent between storage systems only eventually (e.g., when a change is made to one storage system, it is reflected when querying another storage system, but only after a period of time has elapsed for the change to be copied). In some embodiments, data is stored within distributed storage system 202 using a directory tree structure. In some embodiments, data is stored using a distributed scheme that is partially redundant, but not fully mirrored so that the distributed storage system collectively store data but do not all store the same data.

Figure 3:
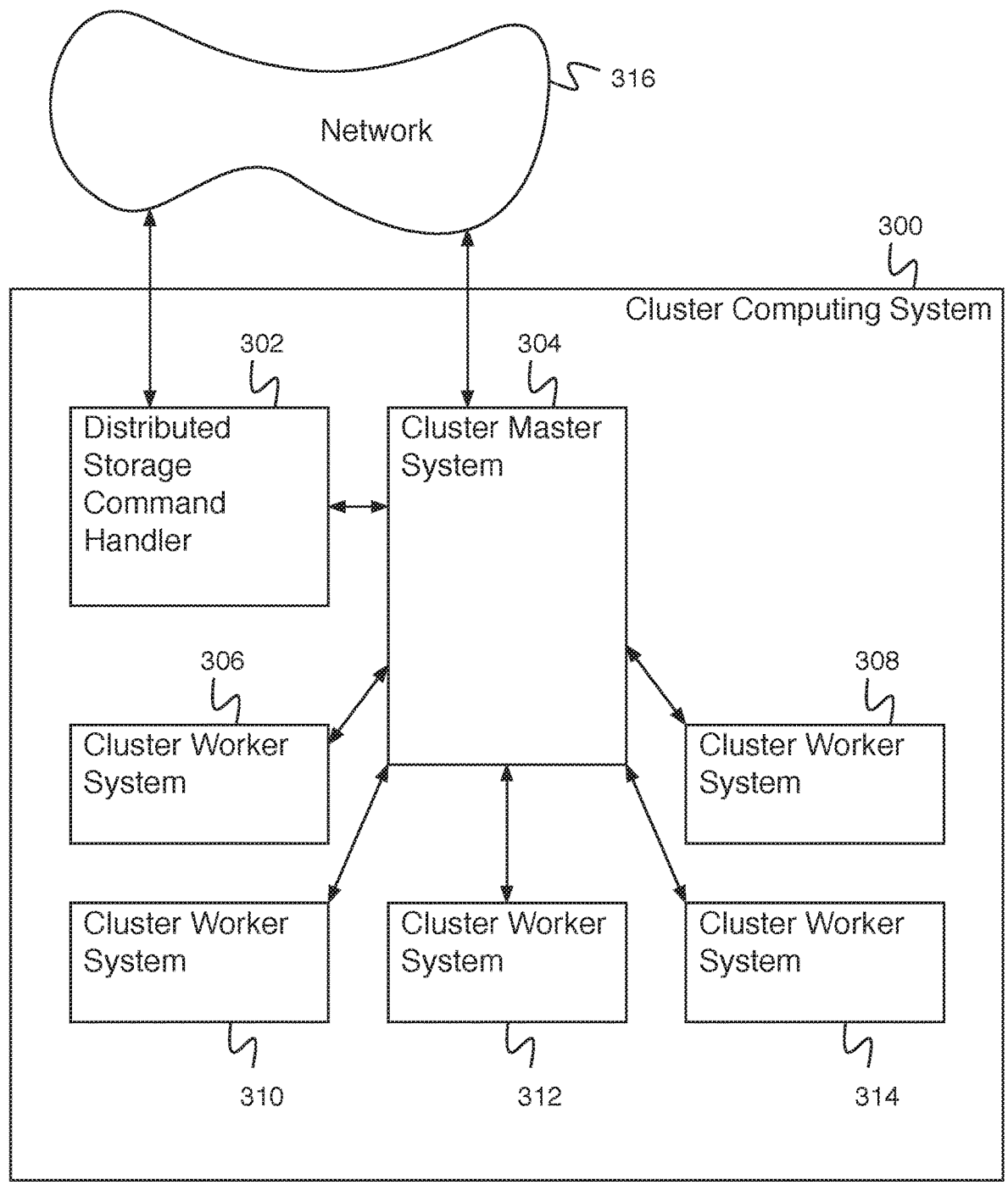
FIG. 3 is a block diagram illustrating an embodiment of a cluster computing system.

FIG. 3 is a block diagram illustrating an embodiment of a cluster computing system. In some embodiments, cluster computing system 300 is used to implement cluster computing system 104 of FIG. 1 and network 316 comprises network 100 of FIG. 1. Distributed storage command handler 302 communicates with a distributed storage system (e.g., distributed storage system 106 of FIG. 1) via network 316. Distributed storage command handler 302 handles communication with a distributed storage system (e.g., executes read, write, modify, and delete commands on a distributed storage system for cluster computing system 300). In some embodiments, distributed storage command handler 302 enforces an atomic commit protocol for cluster computing jobs (e.g., distributed storage command handler 302 only provides listings of files to a user in the event that the cluster computing job associated with a transaction in the event that the transaction has completed). In some embodiments, distributed storage command handler 302 performs garbage collection for cluster computing job data stored on a distributed storage system (e.g., deletes partial results from terminated jobs, deletes committed data marked for deletion, etc.). In some embodiments, distributed storage command handler 302 is implemented using a processor. Cluster master system 304 communicates with one or more network entities (e.g., a user system, an administrator system, a distributed storage system, an application server, another cluster computing system, etc.) via network 316. In various embodiments, cluster computing system 300 receives a cluster computing job from an administrator system or user system, divides the cluster computing job into a set of cluster worker jobs, provides each of the cluster worker jobs to a cluster worker system (e.g., cluster worker system 306, cluster worker system 308, cluster worker system 310, cluster worker system 312, or cluster worker system 314), receives cluster worker job results, stores cluster worker job results (e.g., on a distributed storage system, via distributed storage command handler 302), determines that a cluster computing job has been started, stores a job started indication (e.g., on a distributed storage system, via distributed storage command handler 302), determines that a cluster computing job has been completed, stores a job completed indication (e.g., on a distributed storage system, via distributed storage command handler 302), combines cluster worker job results to determine a cluster computing job result, provides the cluster computing job result, or performs any other appropriate cluster computing job action. In some embodiments, cluster master system 304 is implemented using one or more processors. In some embodiments, each of cluster worker system 306, cluster worker system 308, cluster worker system 310, cluster worker system 312, and cluster worker system 314 are each implemented using one or more processors. In various embodiments, the elements of cluster computing system 300 are each implemented using their own processor, are each implemented using their own computing system, are each implemented using a multiprocessor computing system, are combined onto a single processor, or are combined onto a plurality of processors in any other appropriate way.

Figure 4:
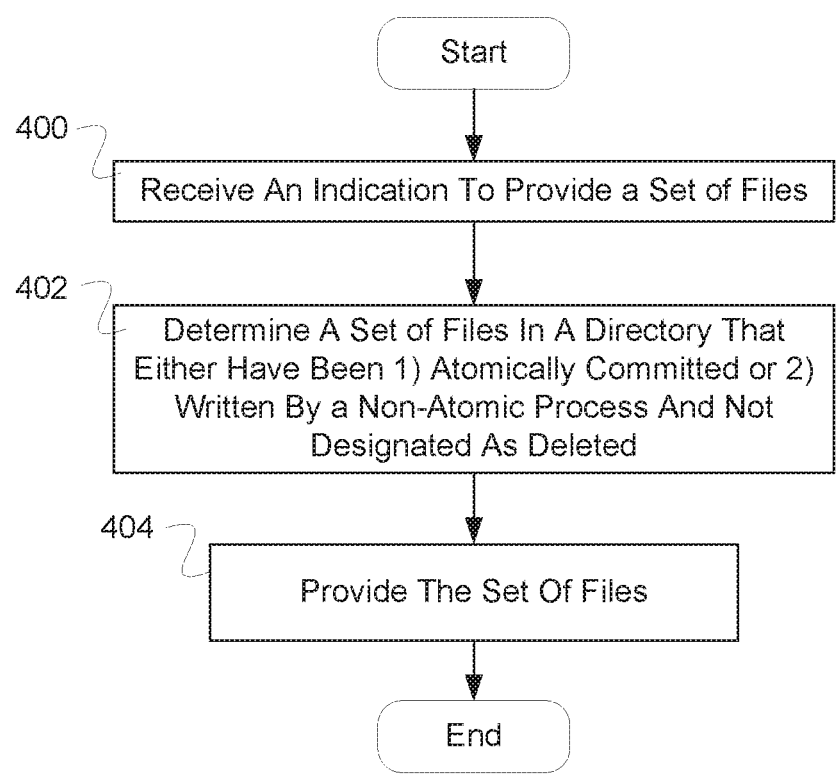
FIG. 4 is a block diagram illustrating an embodiment of a process for directory level atomic commits.

FIG. 4 is a block diagram illustrating an embodiment of a process for directory level atomic commits. In some embodiments, the process of FIG. 4 is executed by distributed storage command handler 302 of FIG. 3. In the example shown, in 400, an indication is received to provide a set of files. In some embodiments, the indication comprises an indication to provide a set of files associated with a cluster computing job. In 402, a set of files in a directory is determined that either have been 1) atomically committed or 2) written by a non-atomic process and not designated as deleted. In 404, the set of files is provided. For example, the set of files is provided in response to the request. In various embodiments, the response is provided to a user or a user initiated executing process.

Figure 5:
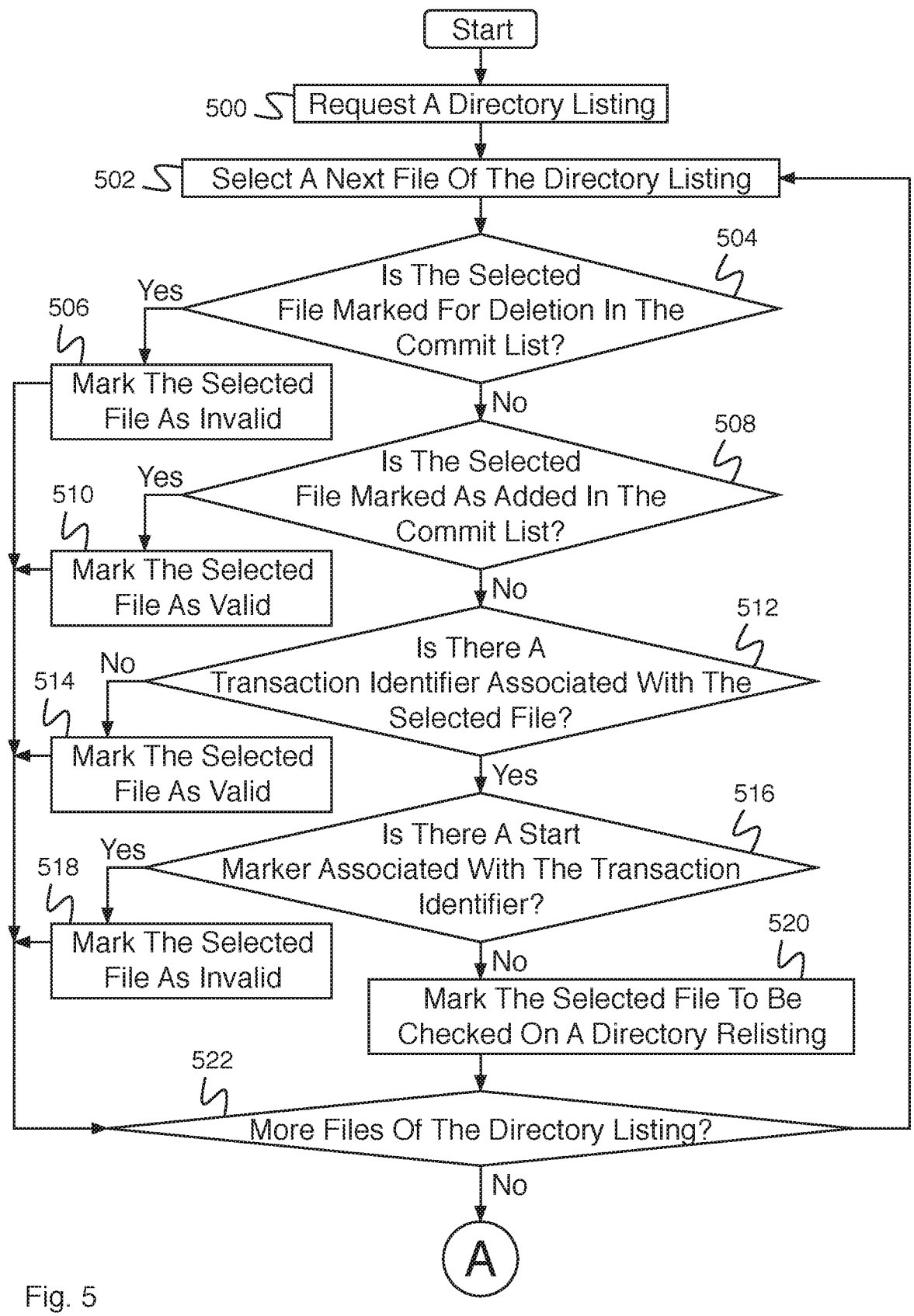
FIGS. 5 and 6 are flow diagrams illustrating an embodiment of a process for determining a set of files in a directory that either have been 1) atomically committed or 2) written by a non-atomic process and not designated as deleted.
Figure 6:
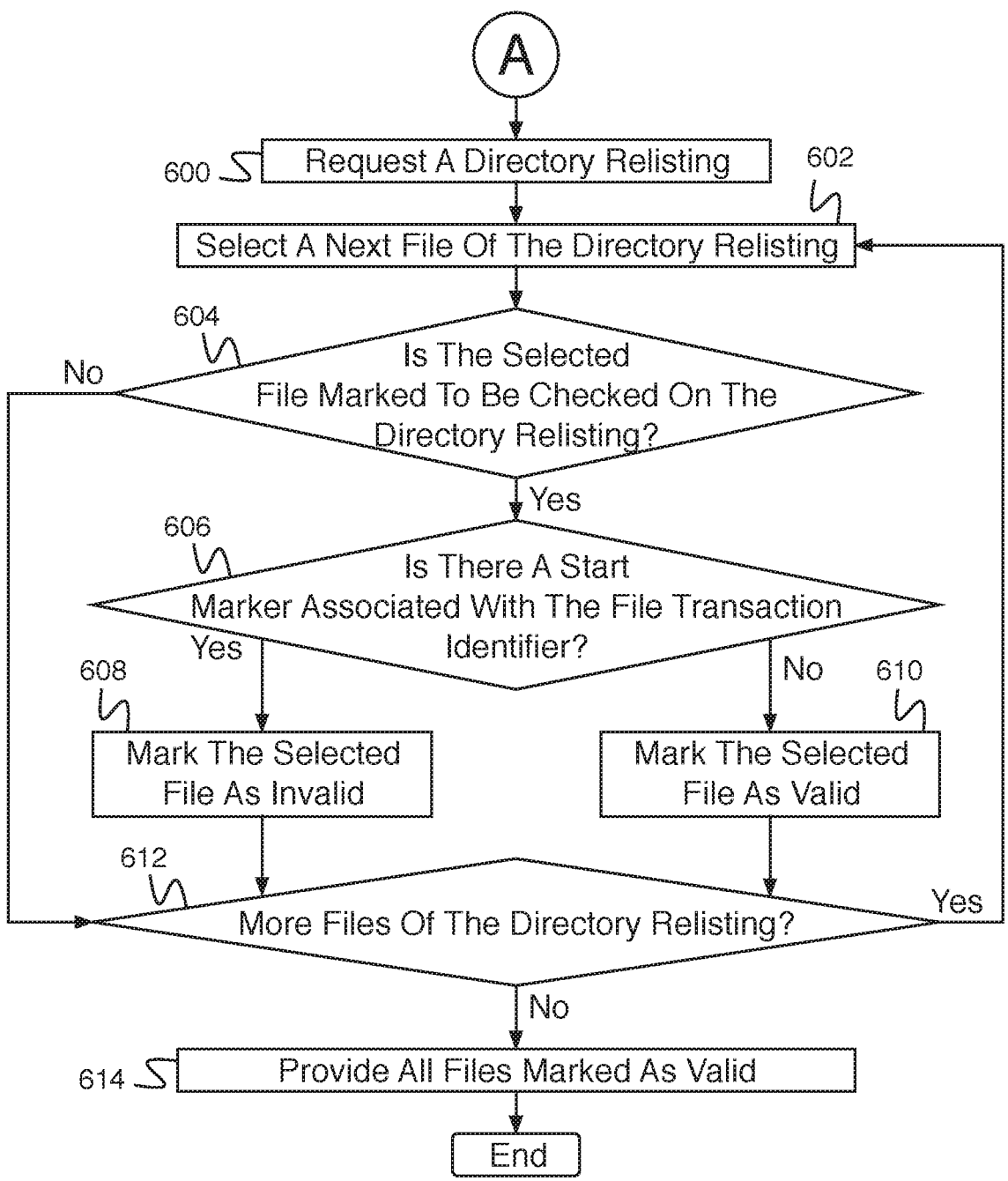

FIGS. 5 and 6 are flow diagrams illustrating an embodiment of a process for determining a set of files in a directory that either have been 1) atomically committed or 2) written by a non-atomic process and not designated as deleted. In some embodiments, the process of FIGS. 5 and 6 implement 402 of FIG. 4. In the example shown in FIG. 5, in 500, a directory listing is requested. In various embodiments, the directory listing comprises a directory listing of a directory for cluster computing job results, a directory associated with the transaction identifier, a home directory, a root directory, multiple directories, a next directory of a set of directories, or any other appropriate directory. In various embodiments, listing files in the directory includes reading a file transaction state, reading a file timestamp, reading a file associated directories, reading a file transaction management indicator, or reading any other appropriate file information. In some embodiments, requesting a directory listing comprises determining a directory associated with the transaction identifier. In 502, a next file of the directory listing is selected. For example, a file of the directory listing is selected for processing. In 504, it is determined whether the selected file is marked for deletion in the commit list. For example, it is determined whether the file is indicated as deleted in a committed marker record. In the event that the selected file is marked for deletion in the commit list, then in 506 the selected file is marked as invalid and control passes to 522. For example, in the event that there is an indication that the selected file is marked for deletion in a committed marker record, then the file is omitted from the set of files provided in response to the request for listing. In the event that the selected file is not marked for deletion in the commit list, then control passes to 508.

In various embodiments, a commit list includes a committed marker indicator associated with the transaction identifier. In various embodiments, a committed marker indicator comprises a metadata committed marker indicator that includes a transaction identifier, a file entry in a committed marker record or file that includes a transaction identifier, or any other appropriate committed marker indicator. In some embodiments, a committed marker file or record name includes the transaction identifier. In some embodiments, a committed marker file name format comprises "_committed_<tid>", wherein <tid> comprises the transaction identifier.

In 508, it is determined whether the selected file is marked as added in the commit list. For example, it is determined whether the file is indicated as added in a committed marker record. In the event that the selected file is marked as added in the commit list, then in 510 the selected file is marked as valid and control passes to 522. For example, in the event that there is an indication that the selected file is marked as added in a committed marker record, then the file is included in the set of files provided in response to the request for listing. In the event that the selected file is not marked as added in the commit list, then control passes to 512.

In 512, it is determined whether there is a transaction identifier associated with the selected file. For example, it is determined whether there is a transaction identifier written in the file, associated with the file as metadata, stored associated with the file, etc. In the event that a transaction identifier is not associated with the selected file, then in 514 the selected file is marked as valid and control passes to 522. For example, in the event that there is not a transaction identifier associated with the selected file, then the file is included in the set of files provided in response to the request for listing. In the event that there is a transaction identifier associated with the selected file, then control passes to 516.

In 516, it is determined whether there is a start marker associated with the transaction identifier. For example, it is determined whether there is a start marker record associated with the transaction identifier. In various embodiments, a start marker associated with the transaction identifier comprises a record or a file that includes a start marker, a metadata start marker, or any other appropriate start marker.

In some embodiments, a start marker file or record name includes the transaction identifier. In some embodiments, a start marker file or record name format comprises "_started-<tid>", wherein <tid> comprises the transaction identifier. In the event that a start marker is associated with the transaction identifier, then in 518 the selected file is marked as invalid and control passes to 522. For example, in the event that there is a start marker associated with the transaction identifier, then the file is included in the set of files provided in response to the request for listing. In the event that there is not a start marker associated with the transaction identifier, then in 520 the selected file is marked to be checked on a directory relisting and control passes to 522. For example, in the event that there is not a start marker associated with the transaction identifier, there may have been a timing condition that the start marker is not seen so the directory is relisted and checked again later for the file.

In 522, it is determined whether there are more files of the directory listing. In the event that there are more files of the directory listing, control passes to 502. In the event that there are not more files of the directory listing, then control passes to A.

In the example shown in FIG. 6, from A in 600 a directory relisting is requested. In 602, a next file of the directory relisting is selected. In 604, it is determined whether the selected file is marked to be checked on the directory relisting. In the event that the selected file is not marked to be checked on the directory relisting, control passes to 612. In the event that the selected file is marked to be checked on the directory relisting, control passes to 606.

In 606, it is determined whether a start marker is associated with the file transaction identifier. For example, it is determined whether there is a start marker record or file with an indication that the file is associated with a file transaction identifier. In various embodiments, a start marker associated with the transaction identifier comprises a record or a file that includes a start marker, a metadata start marker, or any other appropriate start marker. In some embodiments, a start marker file or record name includes the transaction identifier. In some embodiments, a start marker file or record name format comprises "_started-<tid>", wherein <tid> comprises the transaction identifier.

In the event that there is a start marker is associated with the file transaction identifier, in 608 the selected file is marked as invalid and control passes to 612. In the event that there is not a start marker associated with the file transaction identifier, in 610 the file is marked as valid and control passes to 612.

In 612, it is determined whether there are more files of the directory relisting. In the event that there are more files of the directory relisting, then control passes to 602. In the event that there are not more files of the directory relisting, then in 614 all files marked as valid are provided and the process ends.

In some embodiments, it is determined whether all files associated with the transaction identifier are present. In various embodiments, determining whether all files associated with the transaction identifier are present comprises determining whether the correct number of files are present, whether the files match a desired set of files, whether the file names indicate all files are present, or determining whether all files are present in any other appropriate way. In some embodiments, a file is determined to be associated with the transaction identifier in the event the transaction identifier is written in the file. In various embodiments, the transaction identifier written in the file comprises the transaction identifier included in the filename, the transaction identifier included in the file metadata, the transaction identifier included in the first line of the file, or the transaction identifier written in the file in any other appropriate way. In some embodiments, the transaction identifier is written in the file associated with the transaction in a format "tid-<tid>", wherein <tid> comprises the transaction identifier.

Figure 7:
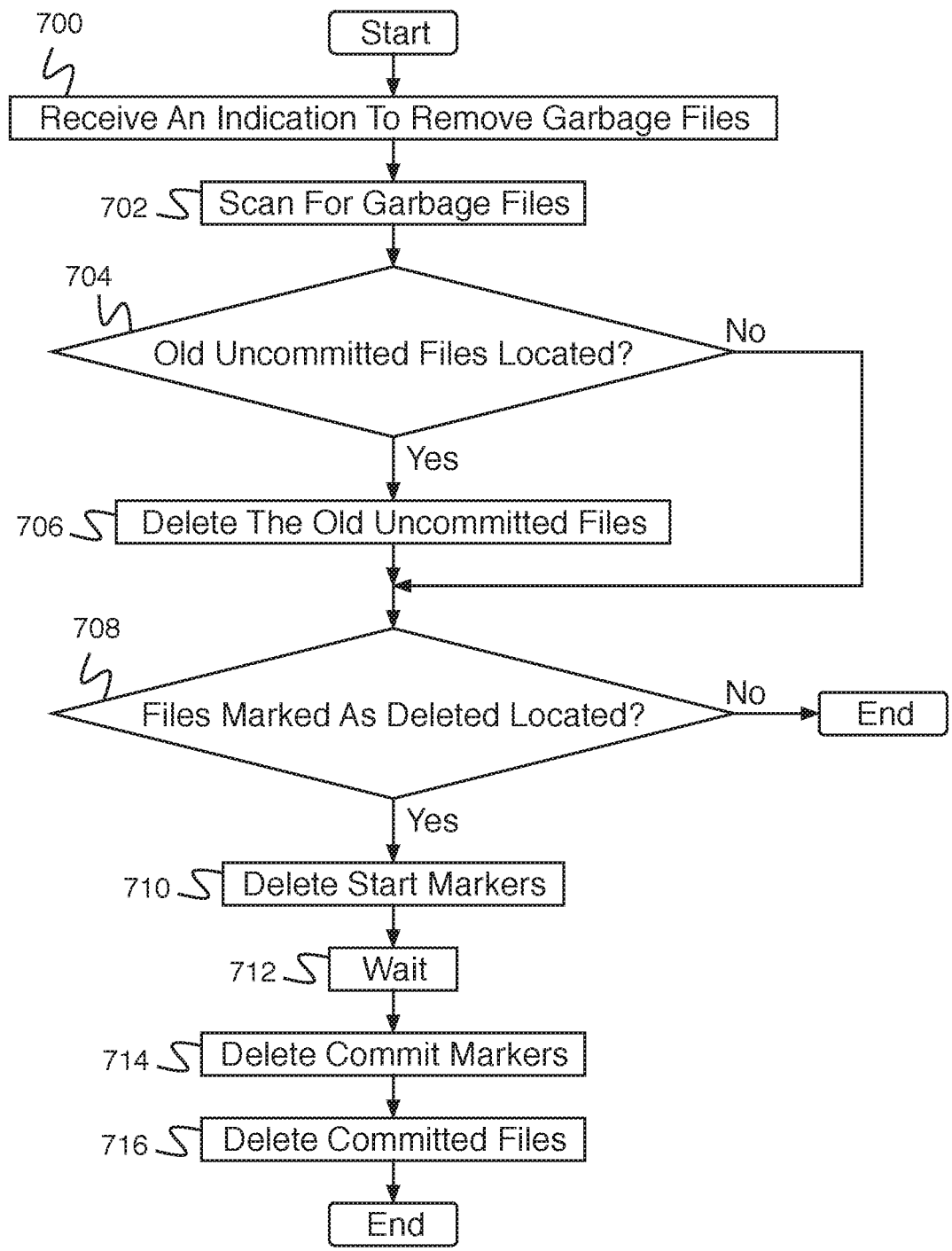
FIG. 7 is a flow diagram illustrating an embodiment of a process for garbage collection.

FIG. 7 is a flow diagram illustrating an embodiment of a process for garbage collection. In some embodiments, the process of FIG. 7 is executed by distributed storage command handler 302 of FIG. 3. In the example shown, in 700, an indication is received to remove garbage files. In various embodiments, an indication to remove garbage files comprises a manual indication, an automatic indication, an indication triggered on a committed marker indicator write, or any other appropriate indication. In 702, the process scans for garbage files. In 704, it is determined whether old uncommitted files are located. In the event old uncommitted files are not located, control passes to 708. In the event old uncommitted files are located, control passes to 706. In 706, the old uncommitted files are deleted. In 708, it is determined whether files marked as deleted are located. In the event files marked as deleted are not located, the process ends. In the event files marked as deleted are located, control passes to 710. In 710, start markers are deleted. In 712, the process waits. In 714, commit markers are deleted. In 716, committed files are deleted.

Figure 8:
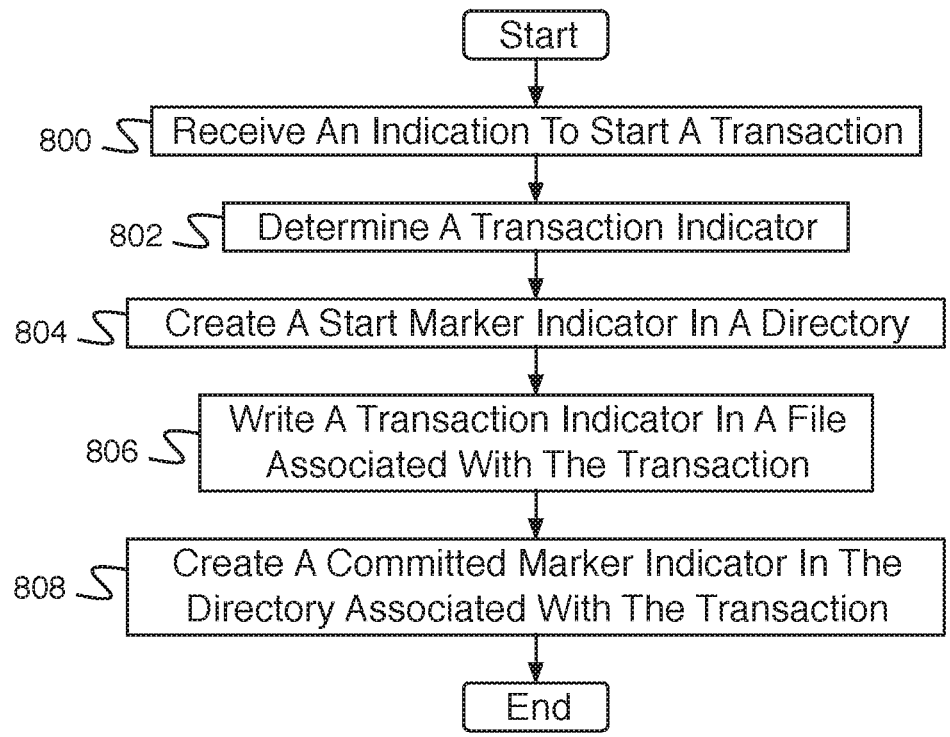
FIG. 8 is a flow diagram illustrating an embodiment of a process for directory level atomic commits.

FIG. 8 is a flow diagram illustrating an embodiment of a process for directory level atomic commits. In some embodiments, the process of FIG. 8 is executed by distributed storage command handler 302 of FIG. 3. In the example shown, in 800, an indication to start a transaction is received. In 802, a transaction indicator is determined. In some embodiments, a transaction indicator is received. In 804, a start marker indicator is created in a directory. In some embodiments, the start marker indicator comprises a start marker file. In some embodiments, the start marker file name includes the transaction identifier. In some embodiments, the start marker file name format comprises "_started-<tid>", wherein <tid> comprises the transaction identifier. In 806, a transaction indicator is written in a file associated with the transaction. In some embodiments, a transaction indicator is written in a plurality of files associated with the transaction. In some embodiments, the transaction identifier is written in the file associated with the transaction in a format "tid-<tid>", wherein <tid> comprises the transaction identifier. In 808, a committed marker indicator is created in the directory associated with the transaction.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for directory level atomic commits, comprising:
   an interface configured to:
      receive an indication to provide a set of files; and
   a processor configured to:
      determine whether a file in a directory has been atomically committed, wherein the determining of whether the file in the directory has been atomically committed comprises to:
         determine whether a transaction identifier is associated with the file; and
         in response to a determination that the transaction identifier is associated with the file:

determine whether there is a start marker record associated with the transaction identifier; and in response to a determination that there is a start marker record associated with the transaction identifier, determine that the file has not been atomically committed; and in the event that the file in the directory has been atomically committed, provide the file as one file of the set of files.

2. The system of claim 1, wherein the committed marker record comprises an indication that the file is marked as added.

3. The system of claim 1, wherein a committed marker record name format comprises "_committed_<tid>", wherein <tid> comprises the transaction identifier.

4. The system of claim 1, wherein determining whether the file in the directory has been atomically committed comprises determining that a committed marker record includes an indication that the file is not marked as deleted.

5. The system of claim 4, wherein determining that there is no start marker record associated with the transaction identifier includes relisting the directory.

6. The system of claim 1, wherein the file is designated as deleted in the event that an indication that the file is marked for deletion in a commit marker record and the file is not provided as one file of the set of files.

7. The system of claim 1, wherein the file is not committed atomically in the event that a start marker record is associated with the file and the file is not marked for deletion in a commit marker record.

8. The system of claim 1, wherein whether a file in a directory has been atomically committed comprises listing files in a directory.

9. The system of claim 8, wherein listing files in the directory includes reading a file transaction state, reading a file timestamp, reading file associated directories, or reading a file transaction management indicator.

10. The system of claim 1, wherein determining whether a file in a directory has been atomically committed comprises determining a directory associated with the transaction identifier.

11. The system of claim 1, wherein the processor is further configured to remove garbage files.

12. The system of claim 11, wherein the garbage files comprise uncommitted files or marked deleted files.

13. The system of claim 11, wherein removing garbage files is triggered on a committed marker indicator write.

14. The system of claim 11, wherein removing garbage files comprises removing start markers.

15. The system of claim 14, wherein removing garbage files comprises removing commit markers.

16. The system of claim 15, wherein commit markers are removed after a delay after removing start markers.

17. The system of claim 11, wherein removing garbage files comprises automatically removing garbage files.

18. A method for directory level atomic commits, comprising:

receiving an indication to provide a set of files;

determining, using a processor, whether a file in a directory has been atomically committed, wherein the determining of whether the file in the directory has been atomically committed comprises:

determining whether a transaction identifier is associated with the file; and in response to a determination that the transaction identifier is associated with the file:

determining whether there is a start marker record associated with the transaction identifier; and in response to a determination that there is a start marker record associated with the transaction identifier, determining that the file has not been atomically committed; and in the event that the file in the directory has been atomically committed, providing the file as one file of the set of files.

19. A computer program product for directory level atomic commits, the computer program product being embodied in a non-transitory computer readable storage medium and comprising computer instructions for:

receiving an indication to provide a set of files;

determining whether a file in a directory has been atomically committed, wherein the determining of whether the file in the directory has been atomically committed comprises:

determining whether a transaction identifier is associated with the file; and in response to a determination that the transaction identifier is associated with the file:

determining whether there is a start marker record associated with the transaction identifier; and in response to a determination that there is a start marker record associated with the transaction identifier, determining that the file has not been atomically committed; and in the event that the file in the directory has been atomically committed, providing the file as one file of the set of files.

* * * * *